United States Patent
Chicken et al.

[11] Patent Number: 6,131,951
[45] Date of Patent: Oct. 17, 2000

[54] PRETENSIONER

[75] Inventors: David Edward Chicken; Douglas Alan Bainbridge; John Hewetson Brown Burgess; Andrew John Downie, all of Carlisle; Raymond George Evans, Fareham; David Smith, Brampton; Kenneth Williamson, Carlisle, all of United Kingdom

[73] Assignee: Breed Automotive Technology, Inc., Lakeland, Fla.

[21] Appl. No.: 09/281,153

[22] Filed: Mar. 30, 1999

[30] Foreign Application Priority Data

May 8, 1998 [GB] United Kingdom .................... 9809973
Jul. 3, 1998 [GB] United Kingdom .................... 9814505

[51] Int. Cl.[7] .................................................. B60R 22/36
[52] U.S. Cl. ............................................................ 280/806
[58] Field of Search .............................................. 280/806

[56] References Cited

U.S. PATENT DOCUMENTS

| | | | |
|---|---|---|---|
| 4,917,210 | 4/1990 | Danicek et al. ........................ | 180/268 |
| 5,288,105 | 2/1994 | Ikegaya et al. ......................... | 280/806 |
| 5,564,748 | 10/1996 | Kmiec et al. ............................ | 280/806 |
| 5,588,677 | 12/1996 | Kopetzky et al. ...................... | 280/806 |
| 5,675,397 | 10/1997 | Bauer et al. ............................. | 280/806 |
| 5,676,397 | 10/1997 | Kmiec et al. ............................ | 280/806 |

FOREIGN PATENT DOCUMENTS 2320469  6/1998  United Kingdom .

*Primary Examiner*—Kenneth R. Rice
*Attorney, Agent, or Firm*—Lonnie R. Drayer

[57] ABSTRACT

A vehicle safety apparatus has a 3-point seatbelt, with a buckle head, and a crash sensor. A pretensioner is connected at the buckle head of the seatbelt for pulling in a length of seatbelt webbing in response to the crash sensor detecting a crash. The pretensioner has a force reservoir and a piston located within and for movement along a pretensioner cylinder under the force of gas from a gas generator. The piston is connected by a cable to the buckle head of the seatbelt. A cable bracket has an inner and outer guide, and wherein the pretensioner cylinder is attached to the inner guide and the buckle mounting is connected to the outer guide.

10 Claims, 3 Drawing Sheets

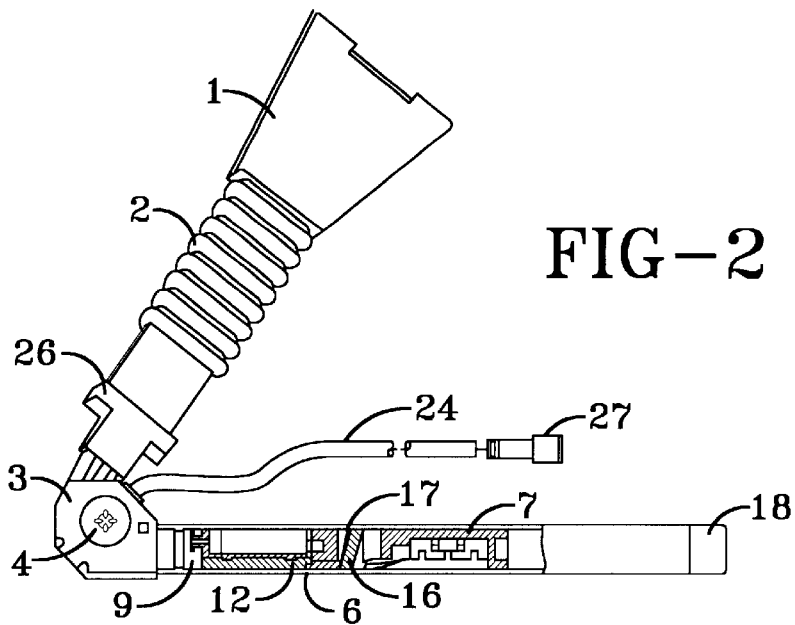
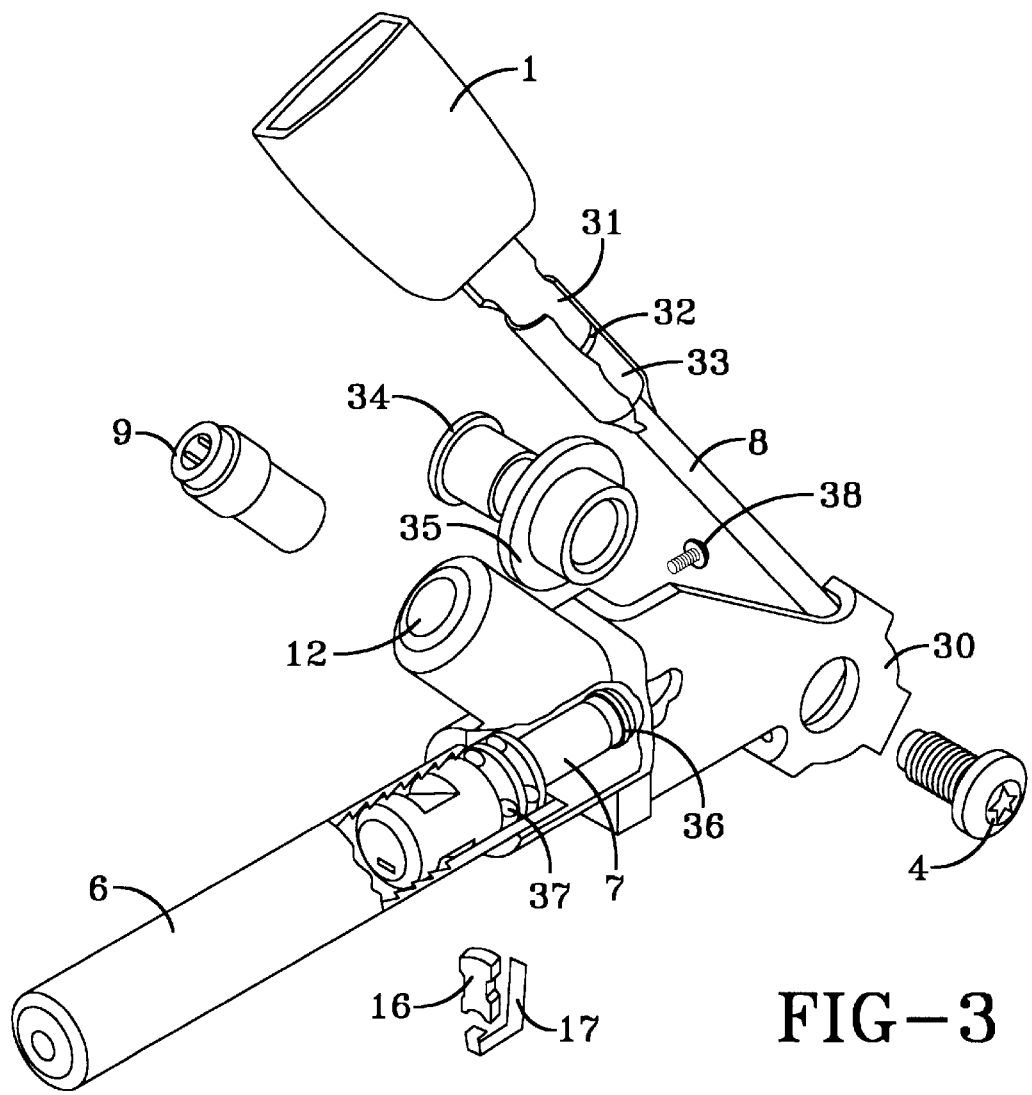

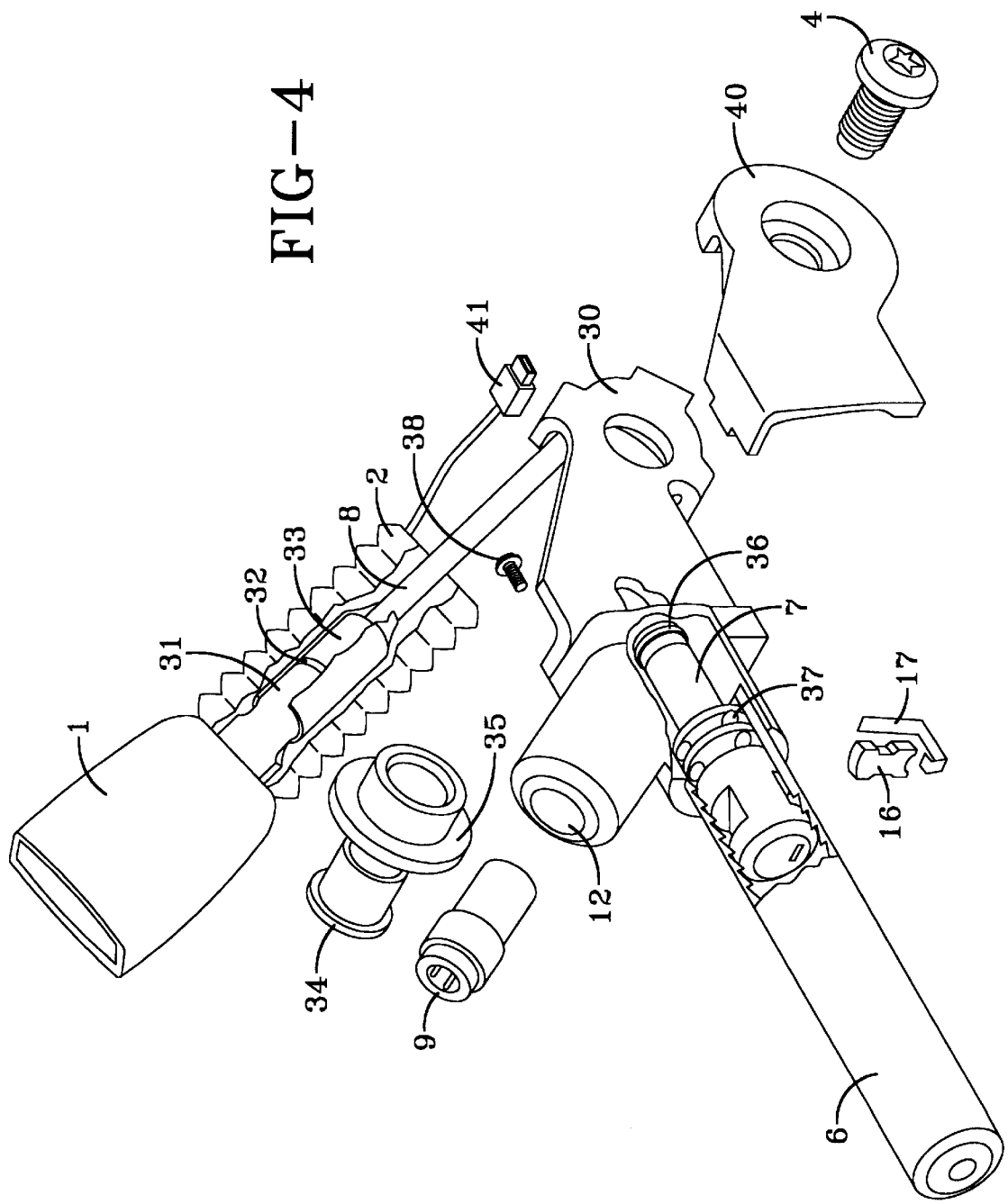

PRETENSIONER

FIELD OF THE INVENTION

The present invention relates to a pretensioner for a vehicle occupant safety restraint and particularly to a buckle pretensioner.

BACKGROUND OF THE INVENTION

Pretensioners are used to rapidly pull in slack in a seatbelt at the onset of a crash to more securely restrain the vehicle occupant against forward movement and potential injury by collision with the internal structure of the vehicle. In addition, the pretensioning operation pulls the occupant into, or at least towards, the correct seating position to maximize the effect of a second restraint such as an airbag.

A modern seatbelt is known as a 3-point restraint because it is secured to the vehicle at three points arranged about the occupant so as to provide a diagonal torso section and a horizontal lap portion to hold the vehicle occupant in the seat. The seatbelt is attached to the vehicle by a spring-loaded retractor tending to pull in the seatbelt, and by a buckle for quick release of the seatbelt.

Pretensioners can be located at the retractor or at the buckle end of the seatbelt. The present invention relates particularly to a buckle end pretensioner and aims to provide an improved pretensioner.

SUMMARY OF THE INVENTION

There is provided in accordance with the invention a vehicle safety apparatus comprising: a 3-point seatbelt having a buckle head, a crash sensor, a pretensioner connected at the buckle head of the seatbelt for pulling in a length of seatbelt webbing in response to the crash sensor detecting a crash, wherein the pretensioner comprises a force reservoir comprising a piston located within and for movement along a pretensioner cylinder under the force of gas from a gas generator, the piston being connected by a cable to the buckle head of the seatbelt, there being a cable bracket having an inner and outer guide, and wherein the pretensioner cylinder is attached to an inner cable guide and the buckle mounting is connected to an outer guide.

BRIEF DESCRIPTION OF THE DRAWINGS

For a better understanding of the present invention and to show how the same may be carried into effect, reference will now be made, by way of example, to the accompanying drawings.

FIG. 2 is a cross sectional view of the safety restraint of FIG. 1.

FIG. 3 is an exploded perspective view of the buckle end of a safety restraint according to a second embodiment of the invention.

FIG. 4 is an exploded perspective view of the buckle end of a safety restraint according to a third embodiment of the invention.

DETAILED DESCRIPTION OF THE INVENTION

Figure 1:
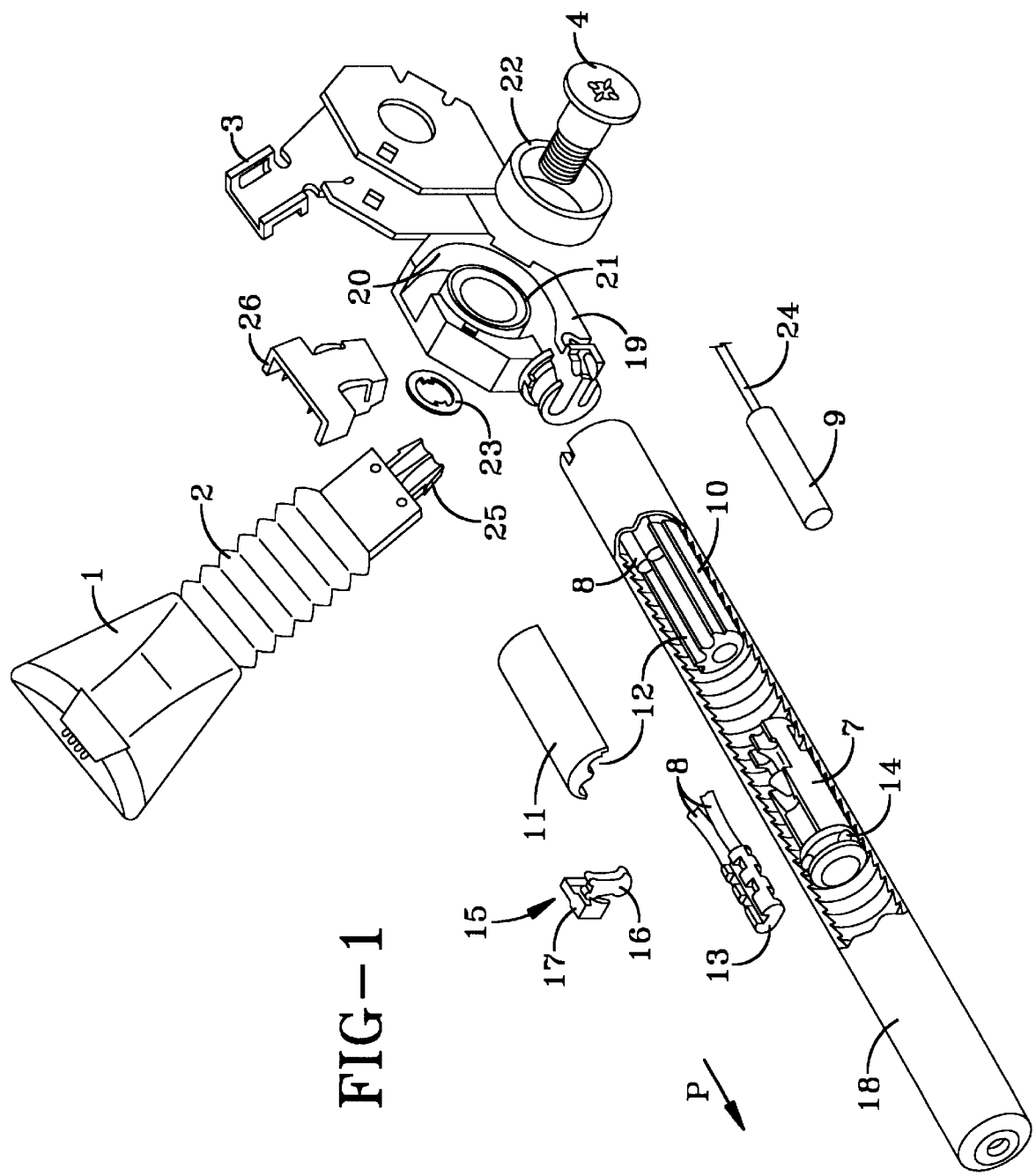
FIG. 1 is an exploded perspective view of the buckle end of a safety restraint according to one embodiment of the invention.

FIG. 1 is an exploded view of a first embodiment of the invention. A buckle head 1, which is arranged to receive a locking tongue from a 3-point seatbelt, is attached via a collapsible bellows 2 to an outer cable guide that is attached to a load bearing part of the vehicle by a locking bolt 4. A pretensioner 5 is used to rapidly retract to the buckle head 1 towards the outer cable guide 3 in the event of a crash. The pretensioner comprises a cylinder tube 6 in which slides a piston 7. A cable 8, which in this case is double stranded, connects the piston to the buckle head 1. Movement of the piston along the cylinder tube pulls the cable and hence pulls the buckle head down towards its mounting point.

The piston 7 is driven along the tube by the force of gas from a gas generator 9 located in the cylinder tube 6 within a gas generator housing that comprises lower part 10 and upper part 11. Channels 12 are formed by grooves in each of the upper and lower gas generator housings, to accommodate the two strands of a cable 8 as it passes from the piston and out of the back of the cylinder tube 6.

Of course, any type of known gas generator may be used, including but not limited to compressed gas cylinders and hybrid inflators in which gas is generated from chemical reactions.

The two stands of the cable 8 are crimped into a cable assembly 13 that is secured in the piston 7. An O ring 14 is located in a groove at the forward end of the piston to provide a seal against the internal surface of the cylinder 6. The internal surface of the cylinder further comprises a series of grooves or saw-tooth formations to engage with a return motion blocking means 15. This comprises a generally elliptical planar member 16 mounted in the piston 7 and biased by a leaf spring 17 so that its outer edge engages with the grooves or teeth on the inside surface of the cylinder. The edge of the elliptical planar member 16, and the shape of the grooves, or teeth, are so profiled that the edge of the ellipse moves smoothly past the grooves or teeth on the inside of cylinder 6 in the pretensioning direction (shown by arrow P), but jams into the grooves and blocks a return motion of the piston in the opposite direction. The spring 17 is a leaf spring and the return motion blocking means 15 forms a subassembly for ease of manufacture. At the end of the cylinder is a break tube 18 of standard construction, which slows down the piston at the end of the pretensioning stroke and prevents it emerging from the end of the cylinder (which would of course be undesirable and indeed dangerous).

The cylinder 6 is attached to an inner cable guide that has a cast or molded arcuate channel 20 running through it about a central ring 21. The ring 21 is optionally surrounded by a rotatable roller 22 to reduce the friction felt by the cable 8 as it passes through the channel. The inner cable guide 19, is surrounded by the outer cable guide 3 and is attached to a low bearing part of the vehicle by a bolt 4 which passes through a locking washer 23.

It will be seen that the load from the buckle head 1 is taken by the outer cable guide 3 and the load from the cylinder 6 is taken by the inner cable guide 19, as also is the load from the cable 8. This has advantages in strength and in package size. The arrangement of the roller 22 is described in GB 2320469 A published Jun. 24, 1998.

The gas generator assembly 9 is connected by wires 24 to a crash sensor (see FIG. 2) which detects a sudden acceleration or deceleration of the vehicle, or detects an impact, indicative of a crash in this embodiment these wires are welded to the gas generator assembly to provide a high quality strong joint with a high temperature and shock tolerance.

One of the wires is chosen to be a special product manufactured by the company Raychem, which acts as an integral attenuator for the gas generator, to prevent accidental firing due to stray electromagnetic waves.

A release indicator 25 is attached to the buckle assembly between the bellows 2 and the outer cable guide 3. A fixing release indicator 26 surrounds the release indictor in its mounting position.

FIG. 2 is a cross sectional view of the embodiment of FIG. 1 and like parts, are denoted by like reference numerals.

A buckle head 1 is connected by bellows 2 and a release indicator fixing 26 to the outer cable guide 3 that is secured to the vehicle by a bolt 4. The generator sub-assembly 9 is located within gas generator housing 12 all of which is contained in cylinder tube 6. A locking ellipse 16 together with its biasing spring 17 is located at the rear end of piston 7. At the end of the cylinder tube 6 is a break tube 18 to slow the piston at the end of its stroke.

A crash sensor 27 is connected by a wire 24 to the gas generator assembly 9. The wire, that preferably includes an attenuator wire, passes through the cable guide 3 into the cylinder 6.

FIG. 3 is a partially cut away and partially exploded view of a second embodiment of the invention. Again like reference numerals refer like parts, where appropriate.

A buckle head assembly 1 is connected via a cable 8 and a cable guide bracket 30 to the piston 7. In the vicinity of the buckle head 1, the cable is protected by an outer plastic sleeve 31 that surrounds a washer 32 and a damper 33 attached to the cable. The damper 33 is a crush tube, for example an aluminum sleeve with ferrules. This absorbs some of the load at the end of the pretensioning stroke as the buckle is drawn towards the cable bracket 30 and thus reduces the incidence of damage to the buckle head 1 in a pretensioning operation.

The cable bracket 30 is attached to a fixed part of the vehicle by bolt 4 which fits through inner and outer sleeves of a rotating bobbin 34, 35 which serves to reduce the friction on the cable as it is pulled back through the cable guide 30.

In this embodiment the gas generator 9 is located in a gas generator housing 12 which is arranged external of the cylinder tube 6 at an angle thereto. The gas generator housing is formed of a cast or molded part connected between the cable bracket 30 and the cylinder tube.

The piston is sealed against the inside surface of the cylinder by a seal 36 at one end and an O-ring seal 37 towards the other end.

Return motion of the piston is prevented by a locking ellipse member 16 biased by leaf spring 17 located in the piston 7.

FIG. 4 is a partially cut away and partially exploded view of a third embodiment of the invention. Again like parts are denoted by like reference numerals where appropriate.

A buckle head 1 is connected by cable 8 to piston 7. The washer 32 and a damper 33, mounted on the cable 8 just below the buckle head, is protected by a plastic sleeve 31 and further by a bellows 2.

The cable passes through the piston 7 via cable guide bracket 30 which is covered by an outer bracket trim 40 and fixed to the vehicle by bolt 4. Friction between the cable 8 and the guide bracket is reduced using inner and outer rotating bobbins 34, 35 respectively in the cable guide bracket. A gas generator 9 is located in the externally arranged gas generator housing 12.

The piston 7 is sealed in the tube 6 by means of seal 36 and O-ring seals 37. Return motion of the piston is prevented by a locking ellipse 16 biased by a leaf spring 17. A use switch connector and cable assembly is shown at 41. A screw 38 serves to connect the guide bracket 30 to the gas generator housing 12. The cylinder tube 6 may be screwed to fix it into the gas generator housing 12.

Each of the embodiments described has various features that are interchangeable with other features of the same embodiment or of the other embodiments. Although several preferred embodiments have been disclosed and described in detail herein, it should be understood that this invention is in now sense limited thereby and its scope is to be determined by the appended claims.

What is claimed is:

1. A vehicle safety apparatus comprising:

a 3-point seatbelt having a buckle head, a crash sensor, a pretensioner connected at the buckle head of the seatbelt for pulling in a length of seatbelt webbing in response to the crash sensor detecting a crash, wherein the pretensioner comprises a force reservoir comprising a piston located within and for movement along a pretensioner cylinder under the force of gas from a gas generator, said gas generator being electrically actuatable and electrical connecting wires link the crash sensor to the gas generator and said wires are welded to the gas generator.

the piston being connected by a cable to the buckle head of the seatbelt, there being a cable bracket having an inner and outer guide, and wherein the pretensioner cylinder is attached to an inner cable guide and the buckle mounting is connected to an outer guide.

2. The vehicle safety apparatus of claim 1 wherein at least one of said wires is an attenuator to inhibit accidental actuation of the gas generator as a result of stray electromagnetic waves.

3. The vehicle safety apparatus of claim 1 further comprising return motion blocking means for preventing movement of the piston in the opposite direction to the pretensioning direction, the blocking means comprising an elliptical planar member mounted to the piston, having an edge that engages grooves on the inside of the cylinder, the elliptical planar member being inclined to the line of movement of the piston and the edge being biased towards the inside wall of the cylinder by a leaf spring, the arrangement being such that the edge rides over the grooves as the piston passes in the pretensioning direction but so that the edge engages one of the grooves and locks the piston against further movement in the opposite, return motion direction.

4. The vehicle safety apparatus of claim 1 wherein a load absorbing crushable tube is arranged around the cable to buckle connection point and the buckle head to absorb loads generated on the buckle at the end of a pretensioning stroke.

5. A vehicle safety apparatus comprising:

a 3-point seatbelt, a crash sensor, a pretensioner connected at the buckle mounting point of the seatbelt for pulling in a length of seatbelt webbing in response to the crash sensor detecting a crash, wherein the pretensioner comprises a force reservoir comprising a piston located within and for movement along a guide cylinder under the force of gas from a gas generator, wherein the gas generator is electrically actuatable and electrical connecting wires link the crash sensor to the gas generator and wherein these wires are welded to the gas generator.

6. Vehicle safety apparatus comprising:

a 3-point seatbelt, a crash sensor, a pretensioner, connected at the buckle mounting point of the seatbelt, for pulling in a length of seatbelt webbing in response to the crash sensor detecting a crash, wherein the pretensioner comprises a force reservoir comprising a piston located within and for movement along a guide cylinder under the force of gas from a gas generator, and electrical connecting wires link the crash sensor to the gas generator and wherein at least one of these wires is formed as an attenuator to inhibit accidental actuation of the gas generator as a result of stray electro-magnetic waves.

7. A vehicle safety apparatus comprising:

a 3-point seatbelt, a crash sensor, a pretensioner, connected at the buckle mounting point of the seatbelt, for pulling in a length of seatbelt webbing in response to the crash sensor detecting a crash, wherein the pretensioner comprises a force reservoir comprising a piston located with and for movement along a guide cylinder under the force of gas from a gas generator, and further comprising return motion blocking means for preventing movement of the piston in the opposite direction to the pretensioning direction, the blocking means comprising a locking member mounted to the piston, having an edge that engages grooves on the inside of the cylinder, the locking member being inclined to the line of movement of the piston and the edge being biased towards the inside wall of the cylinder by a leaf spring, the arrangement being such that the edge rides over the grooves as the piston passes in the pretensioning direction but so that the edge engages one of the grooves and locks the piston against further movement in the opposite, return motion direction.

8. The vehicle safety apparatus of claim 7 wherein the grooves preferably have a saw-tooth profile so that the edge contacts the long sides of the teeth in the pretensioning direction and contacts the short sides in the opposite direction.

9. The vehicle safety apparatus of claim 8 wherein the blocking member is an elliptically formed, generally planar, piece of metal.

10. The vehicle safety apparatus of claim 7 wherein the blocking member is an elliptically formed, generally planar, piece of metal.

* * * * *